J. N. HAVEN.
SOLDERING LAMP.
APPLICATION FILED MAY 13, 1915.
1,163,007.
Patented Dec. 7, 1915.
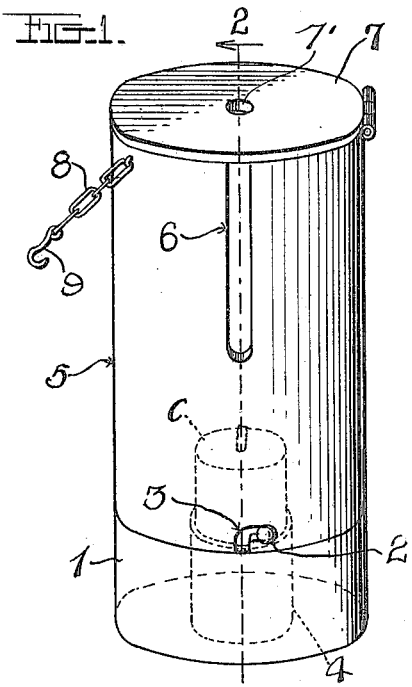
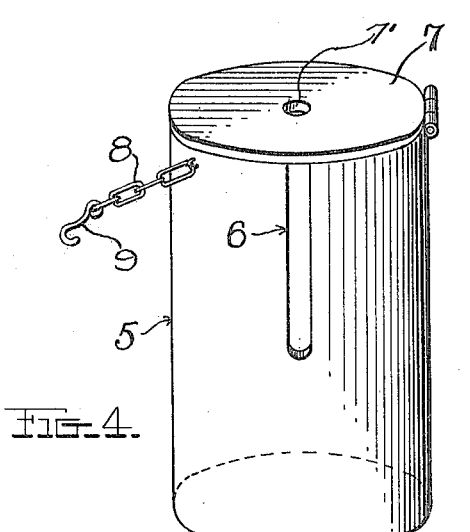
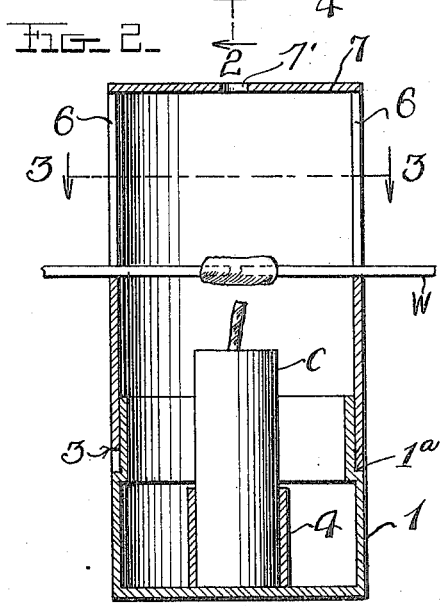
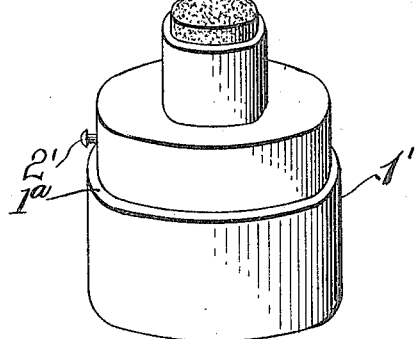
Witnesses
George W. Giovannetti
Inventor
J. N. Haven.
by 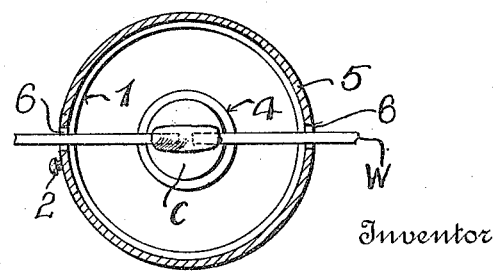
Attorneys

UNITED STATES PATENT OFFICE.

JOHN N. HAVEN, OF WALLA WALLA, WASHINGTON.

SOLDERING-LAMP.

1,163,007.  Specification of Letters Patent.  Patented Dec. 7, 1915.

Application filed May 13, 1915. Serial No. 27,956.

*To all whom it may concern:*

Be it known that I, JOHN N. HAVEN, a citizen of the United States, residing at Walla Walla, in the county of Walla Walla and State of Washington, have invented certain new and useful Improvements in Soldering-Lamps; and I do declare the following to be a full, clear, and exact description of the invention, such as will enable others skilled in the art to which it appertains to make and use the same.

This invention relates to that class of soldering appliances used by electric linemen in soldering joints in electric line wires.

The object of the invention is to provide a device of this character which is simply constructed and may be used equally well by a lineman in soldering together wires on a pole as well as by an installer inside a building.

Another object of the invention is to provide a device of this character which is so constructed as to protect the wires and flame for heating them against the weather.

With these and other objects in view, the invention consists of certain novel features of construction, and the combination and arrangement of parts as will be more fully described and claimed.

In the accompanying drawings: Figure 1 represents a perspective view of a lamp constructed in accordance with this invention. Fig. 2 is a vertical section showing two wires to be joined mounted therein; Fig. 3 is a transverse section taken on the line 3—3 of Fig. 2; Fig. 4 is a perspective view showing a slightly different form of the invention with the parts arranged in juxtaposition ready for assembling.

In the embodiment illustrated a heat supplying member is shown which may be of any suitable or desired configuration either in the form of a candle stick 1 as shown in Figs. 1 and 2, or in the form of an alcohol lamp 1' as shown in Fig. 4. In the form shown in Figs. 1 and 2, the candle stick is shown cylindrical in form having a lateral extension 2 on one side thereof which is designed to engage a bayonet slot 3 in a cylindrical member 5 to be described. Mounted in this cylindrical candle stick is a candle holder 4 adapted to receive the ordinary candle C such as is used ordinarily by linemen for soldering purposes and it is usually about an inch and a quarter in diameter. The alcohol lamp 1' is similar in shape to the candle stick 1 being also provided with a lateral extension 2' so that either one or the other may be used in connection with the cylindrical wire supporting member 5 now to be described. This cylindrical wire supporting member 5 may be composed of any suitable material preferably of heavy metal to adapt it to withstand the strain and uses to which it is designed to be subjected. This cylinder is provided in its opposite sides with slots 6 which extend longitudinally inward from the upper end thereof opening through said upper end, these slots being arranged diametrically opposite and are designed to receive the ends of the wire to be soldered as shown in Figs. 1 and 4. These slots may be of any suitable length and width to accommodate the wires which they are adapted to receive and their inner ends in which the wires are designed to rest are disposed just above and adjacent the top of the heater to properly position the wires in relation to the heater so that sufficient heat will be supplied for causing the solder to flow which connects the wires. This cylinder is preferably provided with a closure 7 hinged to one edge thereof so that the cylinder may be closed when the weather is very windy or rainy to conserve the heat within the cylinder and facilitate the soldering operation. A chain 8 is secured at one end to the cylinder 5 preferably at a point near its top and is provided at its free end with a hook 9 which is designed to engage the lineman's belt or any other suitable support for mounting the lamp in convenient position to facilitate the soldering operation.

The bayonet slot 3 formed in the lower edge of the cylinder 5 is designed to interlockingly engage the laterally extending projection or headed stud 2 on the candle stick 1 or the similar projection 2' on the lamp 1' for connecting either of these members with said cylinder. It is to be understood that the candle stick is ordinarily employed when sufficient heat is provided by the flame of the candle for the soldering operation, but when said heat is found to be insufficient said stick is removed and the alcohol lamp substituted. The candle stick 1 and the lamp 1' are both provided with a cylinder-receiving seat 1ª formed by offsetting the upper portion of the members 1 and 1' thereof, inwardly to adapt the reduced extension formed thereby to fit in the cylinder 5 with the edge of said cylinder resting on said seat, said reduced end fitting snugly within said cylinder. While this cover 7 is shown hinged to the cylinder 5, it is obvious that it may be removably mounted thereon if desired. This cover 7 is preferably provided with an aperture 7' here shown disposed centrally thereof and through which a stick of solder may be inserted without raising the cover, which would be particularly desirable when using the device in windy weather, thus providing for the application of the solder direct to the joint without exposing the flame of the lamp.

In the operation of this apparatus, the ends of the wire W to be connected are arranged in overlapping or abutting position and the solder for connecting them is wound or applied thereto as shown in Figs. 2 and 3, and these ends which are so connected are then inserted in the diametrically opposite slots 6 of the member 5 resting on the inner walls of said slots in which position the solder covered ends will be disposed in the flame of the candle or lamp and sufficient heat will be supplied by said flame to cause the solder to flow and thus reliably connect the ends of the wires.

From the above description, it will be obvious that this device while simple in construction, and small and light to carry, will be thoroughly efficient in operation and may be employed either by a lineman on a pole or by an installer in a building and may be conveniently carried in the pocket or knapsack of the user, its unobstructed smooth outer face especially adapting it for this purpose.

I claim as my invention:

A soldering device of the class described comprising a heater carrying member having a reduced upper end with a seat formed at the base thereof, a tubular wire-supporting member having one end telescopically engaging the reduced end of said heater carrying element with its edge abutting and resting on the seat thereof and the outer face of said member arranged flush with the outer face of said heater carrying member, whereby a smooth unbroken surface is presented throughout the length of said device to prevent engagement with surrounding objects, the other end of said tubular member having oppositely disposed downwardly extending open wire receiving slots terminating at a point adjacent the top of the heater to properly position the wires in relation to said heater, means for detachably connecting said wire-supporting member and said heater carrying member, and a closure for the upper end of said supporting member having a central solder inserting aperture therein.

In testimony whereof I have hereunto set my hand in presence of two subscribing witnesses.

JOHN N. HAVEN.

Witnesses:
W. G. COLEMAN,
R. L. GARRETT.

Copies of this patent may be obtained for five cents each, by addressing the "Commissioner of Patents, Washington, D. C."